United States Patent
Hirota et al.

(10) Patent No.: US 12,025,627 B2
(45) Date of Patent: *Jul. 2, 2024

(54) MANAGEMENT SYSTEM AND MANAGEMENT METHOD

(71) Applicant: FUJIFILM CORPORATION, Tokyo (JP)

(72) Inventors: Kazuhiro Hirota, Kanagawa (JP); Yoshihiro Seto, Kanagawa (JP); Takeya Meguro, Kanagawa (JP); Kaku Irisawa, Kanagawa (JP); Hirotaka Watano, Kanagawa (JP); Taiji Iwasaki, Kanagawa (JP); Tatsuyuki Denawa, Kanagawa (JP); Haruyasu Nakatsugawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 429 days.

This patent is subject to a terminal disclaimer.

(21) Appl. No.: 17/372,550

(22) Filed: Jul. 12, 2021

(65) Prior Publication Data

US 2022/0018863 A1    Jan. 20, 2022

(30) Foreign Application Priority Data

Jul. 15, 2020   (JP) ................. 2020-121720

(51) Int. Cl.
*G01N 35/00* (2006.01)
*G06V 20/00* (2022.01)
(Continued)

(52) U.S. Cl.
CPC ... *G01N 35/00732* (2013.01); *G01N 35/0092* (2013.01); *G06V 20/00* (2022.01);
(Continued)

(58) Field of Classification Search
CPC ......... G01N 35/00732; G01N 35/0092; G01N 2035/00831; G06V 20/00; G06V 20/62; G06V 30/412
(Continued)

(56) References Cited

U.S. PATENT DOCUMENTS

2012/0160039 A1   6/2012 Tatsutani
2017/0185815 A1*  6/2017 Itoh ...................... G06K 7/1413
(Continued)

FOREIGN PATENT DOCUMENTS

JP    H09-068535 A    3/1997
JP    2012-141149 A   7/2012
WO    2017073567 A1   5/2017

OTHER PUBLICATIONS

English language translation of the following: Office action dated Aug. 1, 2023 from the JPO in a Japanese patent application No. 2020-121720 corresponding to the instant patent application. This office action translation is submitted now in order to supplement the understanding of the cited references which are being disclosed in the instant Information Disclosure Statement.

*Primary Examiner* — Ali Bayat
(74) *Attorney, Agent, or Firm* — SOLARIS Intellectual Property Group, PLLC

(57) ABSTRACT

A management system including at least one processor, wherein the processor is configured to acquire a captured image obtained by imaging an outer surface of each of plural sample containers which contains a sample and in which discrimination information for discriminating a subject from whom the sample is collected is given to the outer surface, and associate a test result related to the sample contained in each of the sample containers with a test order in which information of a discrimination image including the dis-
(Continued)

crimination information is registered in advance for each subject, based on the captured image and the test order.

18 Claims, 18 Drawing Sheets

(51) Int. Cl.
 *G06V 20/62* (2022.01)
 *G06V 30/412* (2022.01)
(52) U.S. Cl.
 CPC ............ *G06V 20/62* (2022.01); *G06V 30/412* (2022.01); *G01N 2035/00831* (2013.01)
(58) Field of Classification Search
 USPC ........................................................ 382/103
 See application file for complete search history.

(56) References Cited

U.S. PATENT DOCUMENTS

| | | | |
|---|---|---|---|
| 2017/0329922 A1* | 11/2017 | Eberting | G16H 40/67 |
| 2018/0350450 A1 | 12/2018 | Dejima | |
| 2020/0043577 A1* | 2/2020 | Jiang | G16H 10/60 |
| 2020/0251213 A1* | 8/2020 | Tran | G06N 20/00 |
| 2023/0223126 A1* | 7/2023 | Eberting | G06Q 30/0601 |
| | | | 705/2 |

* cited by examiner

FIG. 6

TEST ORDER (COMPANY P)

| SUBJECT ID | NAME | GENDER | AGE |
|---|---|---|---|
| P101 | ICHIRO FUJI | MALE | 37 |
| P102 | ICHIRO FUJI | MALE | 50 |
| P103 | TARO SANYO | MALE | 25 |
| ⋮ | ⋮ | ⋮ | ⋮ |

TEST ORDER (COMPANY Q)

| SUBJECT ID | NAME | GENDER | AGE |
|---|---|---|---|
| Q101 | JIRO SANYO | MALE | 21 |
| Q102 | HANAKO FUJI | FEMALE | 29 |
| ⋮ | ⋮ | ⋮ | ⋮ |

PRE-REGISTRATION FORM

REGISTRATION DATE 4 MONTH 26 DAY 2019 YEAR

NAME ICHIRO FUJI

AGE 37 YEARS OLD

GENDER (MALE) FEMALE

AFFILIATION GROUP COMPANY P

DISCRIMINATION INFORMATION (EX) SIGNATURE, IMPRINT, SYMBOL, PICTURE, PHOTOGRAPH, ETC

EDITING PASSWORD abcd1234

FIG. 8

TEST ORDER (COMPANY P)

| SUBJECT ID | NAME | GENDER | AGE | DISCRIMINATION IMAGE |
|---|---|---|---|---|
| P101 | ICHIRO FUJI | MALE | 37 | *Fuji* — 70, 72 |
| P102 | ICHIRO FUJI | MALE | 50 | Fuji Ichiro |
| P103 | TARO SANYO | MALE | 25 | SANYO |
| ⋮ | ⋮ | ⋮ | ⋮ | |

TEST ORDER (COMPANY Q)

| SUBJECT ID | NAME | GENDER | AGE | DISCRIMINATION IMAGE |
|---|---|---|---|---|
| Q101 | JIRO SANYO | MALE | 21 | ♑ |
| Q102 | HANAKO FUJI | FEMALE | 29 | Hanako |
| ⋮ | ⋮ | ⋮ | ⋮ | |

FIG. 10

IMAGE AND TEST RESULT

| TEST ID | LABEL IMAGE | MEASURED VALUE |
|---|---|---|
| 0001 | Fuji  (MALE) FEMALE 37 YEARS OLD | 5 |
| 0002 | Fuji Ichiro  (MALE) FEMALE 50 YEARS OLD | 101 |
| 0003 | (SANYO)  (MALE) FEMALE 25 YEARS OLD | 8 |
| 0004 | Hanako  MALE (FEMALE) 29 YEARS OLD | 0 |
| 0005 | ♑  (MALE) FEMALE 21 YEARS OLD | 6 |
| ⋮ | ⋮ | ⋮ |

TEST RESULT REPORT

COMPANY P

| SUBJECT ID | NAME | GENDER | AGE | TEST ID | LABEL IMAGE | MEASURED VALUE |
|---|---|---|---|---|---|---|
| P101 | ICHIRO FUJI | MALE | 37 | 0001 | *Fuji* — MALE 37 YEARS OLD | 5 |
| P102 | ICHIRO FUJI | MALE | 50 | 0002 | *Fuji Ichiro* — MALE 50 YEARS OLD | 101 |
| P103 | TARO SANYO | MALE | 25 | 0003 | (seal) — MALE 25 YEARS OLD | 8 |
| ... | ... | ... | ... | ... | ... | ... |

COMPANY Q

| SUBJECT ID | NAME | GENDER | AGE | TEST ID | LABEL IMAGE | MEASURED VALUE |
|---|---|---|---|---|---|---|
| Q101 | JIRO SANYO | MALE | 21 | 0005 | *Ji* — MALE 21 YEARS OLD | 6 |
| Q102 | HANAKO FUJI | FEMALE | 29 | 0004 | *Hanako* — FEMALE 29 YEARS OLD | 0 |
| ... | ... | ... | ... | ... | ... | ... |

| TEST ORDER (COMPANY P) | | | | |
|---|---|---|---|---|
| SUBJECT ID | NAME | GENDER | AGE | DISCRIMINATION IMAGE |
| P101 | ICHIRO FUJI | MALE | 37 | *Fuji* |
| P102 | ICHIRO FUJI | MALE | 50 | *Fuji Ichiro* |
| P103 | TARO SANYO | MALE | 25 | (SANYO) |
| ... | ... | ... | ... | ... |

| TEST ORDER (COMPANY Q) | | | | |
|---|---|---|---|---|
| SUBJECT ID | NAME | GENDER | AGE | DISCRIMINATION IMAGE |
| Q101 | JIRO SANYO | MALE | 21 | *Yb* |
| Q102 | HANAKO FUJI | FEMALE | 29 | *Hanako* |
| ... | ... | ... | ... | ... |

| IMAGE AND TEST RESULT | | | |
|---|---|---|---|
| TEST ID | LABEL IMAGE | | MEASURED VALUE |
| --- | MALE / FEMALE ___ YEARS OLD | | --- |
| 0001 | *Fuji* | (MALE) / FEMALE 37 YEARS OLD | 5 |
| 0002 | *Fuji Ichiro* | MALE / FEMALE 50 YEARS OLD | 101 |
| 0003 | (SANYO) | (MALE) / FEMALE 25 YEARS OLD | 8 |
| --- | MALE / FEMALE ___ YEARS OLD | | --- |
| 0004 | *Hanako* | MALE / (FEMALE) 29 YEARS OLD | 0 |
| 0005 | *Yb* | (MALE) / FEMALE 21 YEARS OLD | 6 |
| --- | MALE / FEMALE ___ YEARS OLD | | --- |
| ... | ... | | ... |

FIG. 19
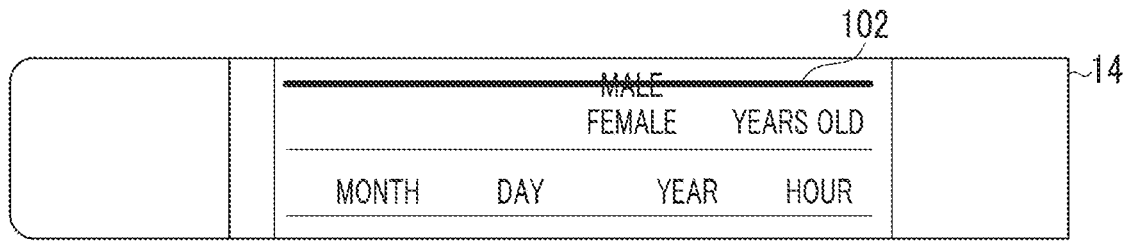
FIG. 20
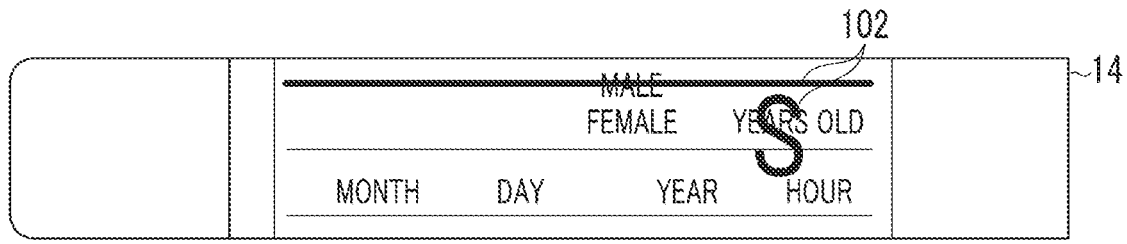
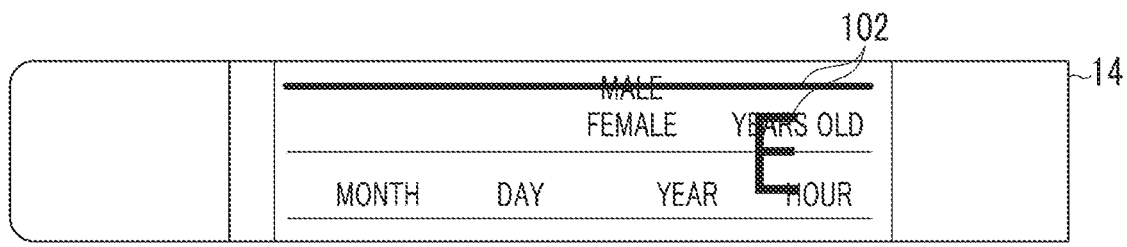
FIG. 21
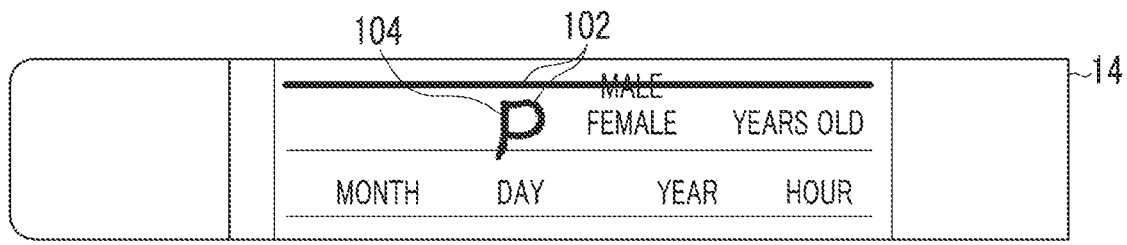
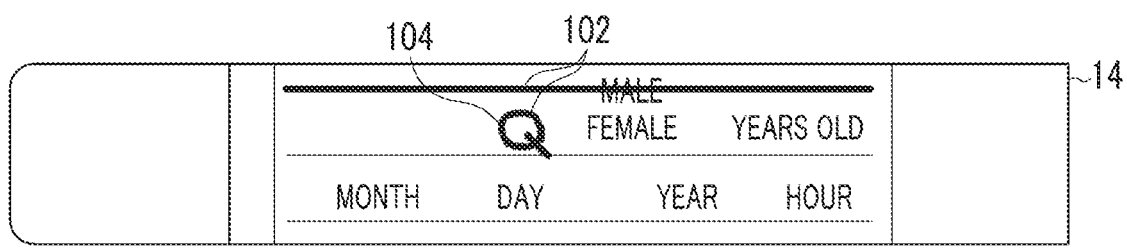

MANAGEMENT SYSTEM AND MANAGEMENT METHOD

CROSS-REFERENCE TO RELATED APPLICATIONS

The present application claims priority under 35 U.S.C. § 119 to Japanese Patent Application No. 2020-121720, filed on Jul. 15, 2020. The above application is hereby expressly incorporated by reference, in its entirety, into the present application.

BACKGROUND

Technical Field

The present disclosure relates to a management system and a management method.

Related Art

In the related art, various tests such as a fecal occult blood test and a blood test have been performed. In some of these tests, for example, an institution that performs a test such as a testing institution and an institution that uses the test results such as a hospital may be different.

For example, in the case of a fecal occult blood test, a subject collects a sample such as feces and submits it to the hospital. The hospital provides the testing institution with a test order including information such as name, gender, and age to specify each subject, as well as samples submitted by plural subjects. The testing institution performs tests on each of plural samples provided by the hospital, and notifies the hospital and/or the subject by associating the subject with the test result, based on the test order received from the hospital.

That is, the testing institution is performing the work of associating the test result related to the sample in a sample container containing the sample with the test order. In the related art, this work has been performed by a method such as manually attaching a barcode or the like issued based on a test order to a corresponding sample container of a subject and reading the barcode at the time of testing the sample.

For example, there is disclosed a technique for associating a test card including a field in which the name of a test subject is written in handwritten characters and a barcode with a sample container using the barcode (see JP1997-068535A (JP-H09-068535A)). JP1997-068535A (JP-H09-068535A) describes that in a case where test analysis result data related to each sample container is output as a test report, the name field of the corresponding test card is output as image data.

SUMMARY

In recent years, in order to improve the efficiency of the above-mentioned test work, there is a demand for a technique capable of appropriately associating a test result related to a sample contained in a sample container with a test order without giving an identification unit such as a barcode to the sample container.

The present disclosure has been made in view of the above circumstances, and an object of the present disclosure is to provide a management system and a management method capable of appropriately associating a test result with a test order.

A management system according to an aspect of the present disclosure comprises at least one processor. The processor is configured to acquire a captured image obtained by imaging an outer surface of each of plural sample containers which contains a sample and in which discrimination information for discriminating a subject from whom the sample is collected is given to the outer surface, and associate a test result related to the sample contained in each of the sample containers with a test order in which information of a discrimination image including the discrimination information is registered in advance for each subject, based on the captured image and the test order.

In the management system according to the aspect of the present disclosure, the processor may be configured to associate the test result related to the sample contained in each of the sample containers with the test order by comparing an image of the discrimination information included in the captured image with the information of the discrimination image registered in the test order.

In the management system according to the aspect of the present disclosure, the discrimination image may be an image obtained by each subject imaging his/her own discrimination information in advance.

In the management system according to the aspect of the present disclosure, the discrimination image may be an image obtained by imaging the discrimination information entered on a form.

In the management system according to the aspect of the present disclosure, the discrimination image may be an image obtained by imaging the discrimination information given to the outer surface of the sample container.

In the management system according to the aspect of the present disclosure, the discrimination image may be an image generated by each subject drawing his/her own discrimination information on a drawing device.

In the management system according to the aspect of the present disclosure, the discrimination information may include at least one of a signature, a symbol, a picture, or a photograph set by each subject.

In the management system according to the aspect of the present disclosure, the discrimination information may include a first identification number set for each subject.

In the management system according to the aspect of the present disclosure, the discrimination information may include a second identification number set for each sample container.

In the management system according to the aspect of the present disclosure, the processor may be configured to acquire a captured image obtained by imaging an outer surface of a boundary container in which group boundary information indicating a boundary between plural groups of subjects is given to the outer surface in a case where there are the plurality of groups and samples are continuously tested for the plurality of groups, recognize the group boundary information given to the boundary container based on the captured image, and associate the test result related to the sample contained in each of the sample containers with a test order in which the group is divided corresponding to the group boundary information, based on a result of the recognition and the test order.

In the management system according to the aspect of the present disclosure, the boundary container may be a sample container containing a sample to be tested at at least one of first or last in the group.

In the management system according to the aspect of the present disclosure, the boundary container may be a dummy container which does not contain a sample.

In the management system according to the aspect of the present disclosure, the group boundary information may include group discrimination information for discriminating a group to which the subject belongs, and the processor may be configured to further recognize the group discrimination information based on the captured image, and associate the test result related to the sample contained in each of the sample containers with the test order further including the group discrimination information, based on a result of the recognition and the test order.

In the management system according to the aspect of the present disclosure, the group boundary information may be represented by at least one of a character or a symbol.

In the management system according to the aspect of the present disclosure, a fact that subject information is not entered on an outer surface of the dummy container may be used as the group boundary information.

In the management system according to the aspect of the present disclosure, the processor may be configured to perform control such that the test result and the test order are displayed on a display in association with each other.

In the management system according to the aspect of the present disclosure, the processor may be configured to generate a label image for each of plural subjects by extracting an area including the discrimination information from the captured image, and perform control such that the label image, the test result, and the test order are displayed on a display in association with each other based on the discrimination information included in the label image.

A management method according to another aspect of the present disclosure comprises acquiring a captured image obtained by imaging an outer surface of each of plural sample containers which contains a sample and in which discrimination information for discriminating a subject from whom the sample is collected is given to the outer surface, and associating a test result related to the sample contained in each of the sample containers with a test order in which information of a discrimination image including the discrimination information is registered in advance for each subject, based on the captured image and the test order.

According to the aspects of the present disclosure, it is possible to provide a management system and a management method capable of appropriately associating a test result with a test order.

BRIEF DESCRIPTION OF THE DRAWINGS

FIG. 6 is a diagram showing an example of a test order.

FIG. 8 is a diagram showing an example of a test order in which a discrimination image is registered.

FIG. 10 is a diagram showing an example of a captured image obtained by imaging a sample container and a test result.

FIG. 11 is a diagram showing a process of associating a test result with a test order.

FIG. 12 is a diagram showing an example of a screen in which a test result and a test order are displayed in association with each other.

FIG. 17 is a diagram showing an example of a dummy container to which group boundary information is given.

FIG. 18 is a diagram showing a process of associating a test result with a test order.

FIG. 19 is a diagram showing an example of a dummy container to which group boundary information is given.

FIG. 20 is a diagram showing an example of a dummy container to which group boundary information is given.

FIG. 21 is a diagram showing an example of a dummy container to which group boundary information is given.

DESCRIPTION OF EMBODIMENTS

Hereinafter, each embodiment of the present disclosure will be described in detail with reference to the drawings.

First Embodiment

Figure 1:
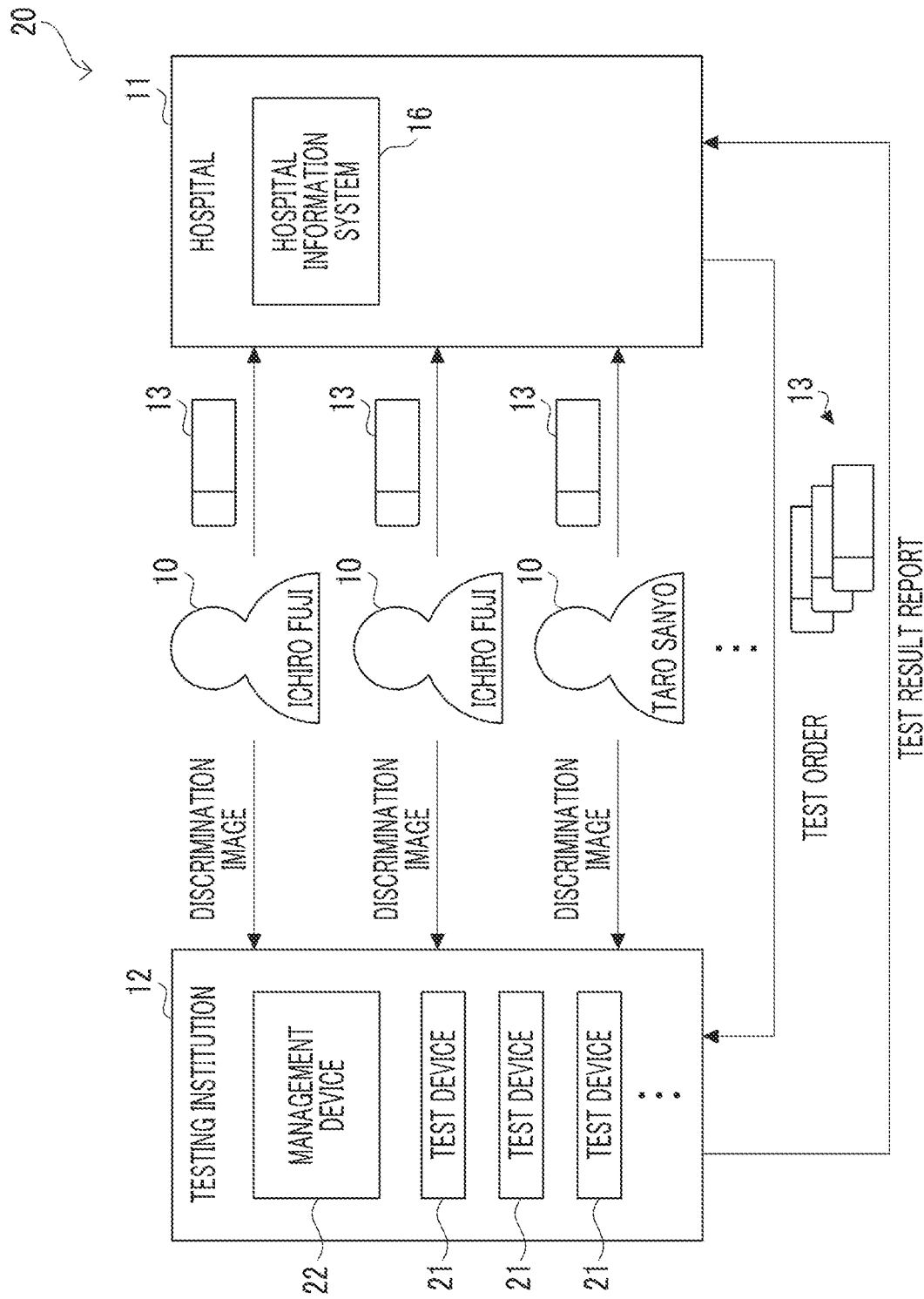
FIG. 1 is a diagram showing an example of a configuration of a management system according to each embodiment.

First, the configuration of a management system 20 of the present disclosure will be described with reference to FIG. 1. As shown in FIG. 1, in various medical-related tests such as a fecal occult blood test or a blood test (hereinafter, simply referred to as a "test"), a hospital 11 visited by a subject 10 for a health diagnosis, other tests, or diagnosis, and a testing institution 12 which is a separate organization from the hospital 11 are involved.

The subject 10 collects a sample to be used for the test, contains the collected sample in a dedicated container (hereinafter referred to as a "sample container") 13, and submits it to the hospital 11. The sample is the body tissue or secretions of the subject 10. For example, in the fecal occult blood test, the sample is the feces of the subject 10. In the blood test, the sample is the blood of the subject. Hereinafter, for the sake of description, it is assumed that the test to be performed is specifically a fecal occult blood test. In addition, the subject 10 submits a discrimination image 72 including his/her own discrimination information 70 to the testing institution 12 (details will be described later).

On the other hand, the hospital 11 usually requests a test to the testing institution 12, which is a specialized institution for a test. For example, the hospital 11 issues a test request (hereinafter, referred to as a "test order"; details will be described later) to the testing institution 12 by using a hospital information system (HIS) 16 or the like. Further, the hospital 11 sends the sample container 13 containing the sample to the testing institution 12.

Figure 2:
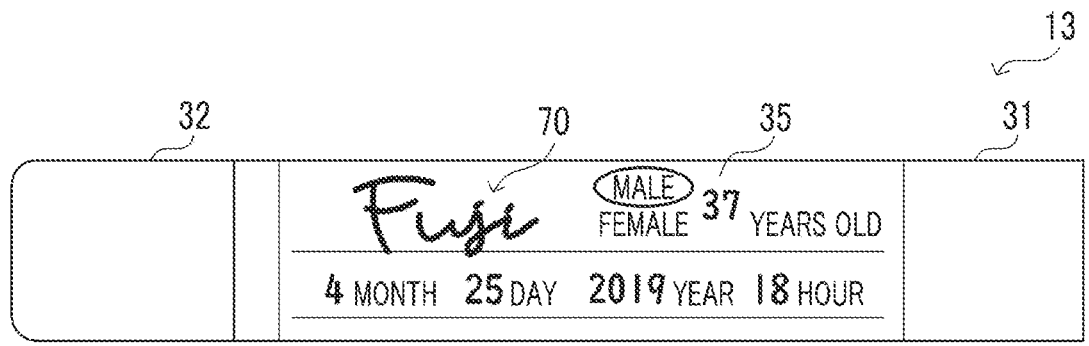
FIG. 2 is a diagram showing an example of a sample container for a fecal occult blood test.

FIG. 2 is a diagram showing a stool collection container as an example of the sample container 13. The sample container 13 is a container made into a kit so that the subject 10 can collect stool by himself/herself and store it stably for a certain period of time. As shown in FIG. 2, the sample container 13 comprises a container body 31 for containing feces as a sample, and a cap 32 attachably and detachably provided on the container body 31. The container body 31 is, for example, transparent or translucent, and contains a diluent and/or a storage solution of feces as a sample therein. An insertion part (not shown) to be inserted into the container body 31 is attached to the cap 32. Therefore, the subject 10 removes the cap 32 from the container body 31, collects feces by tracing the surface of the feces as a sample with the distal end of the insertion part, inserts the insertion part into the container body 31, and closes the cap 32 to thereby collect the feces as a sample.

In the sample container 13, a label 35 is attached to the outer surface of the container body 31, and the subject 10 can enter various information including his/her own discrimination information 70 on the label 35. That is, at least the discrimination information 70 for discriminating the subject from whom the sample contained in the sample container 13 was collected is given to the outer surface of the sample container 13. The discrimination information 70 is information given to the outer surface of the sample container 13, and is information unique to a subject for specifying one subject from among plural subjects.

In the example of FIG. 2, the label 35 is provided with a signature ("Fuji") written by the subject as an example of the discrimination information 70, a gender selection field ("male"), an age entry field ("37 years old"), and a stool collection date and time entry field ("month: 4 day: 25 year: 2019 hour: 18").

Since the fecal occult blood test is usually performed using feces for two days, two types of labels 35 in different colors may be used to distinguish the sample containers 13 for two days related to the same person. For example, in FIG. 2, the characters indicating the gender selection field ("male" and "female"), the characters indicating the age entry field ("years old"), the characters indicating the stool collection date and time entry field ("month", "day", "year", and "hour"), and/or other ruled lines may be different in color. Hereinafter, for the sake of simplification of the description, only one sample container 13 related to the same subject 10 will be described.

The testing institution 12 comprises at least one test device 21, and a management device 22. The management system 20 according to an aspect of the present disclosure includes the management device 22 and some or all of the test devices 21. The testing institution 12 may comprise plural types of test devices 21 depending on the type of test to be performed. For example, in a case where the testing institution 12 supports a fecal occult blood test and a blood test, it may comprise two types of test devices 21, a fecal occult blood test device and a blood test device.

Figure 3:
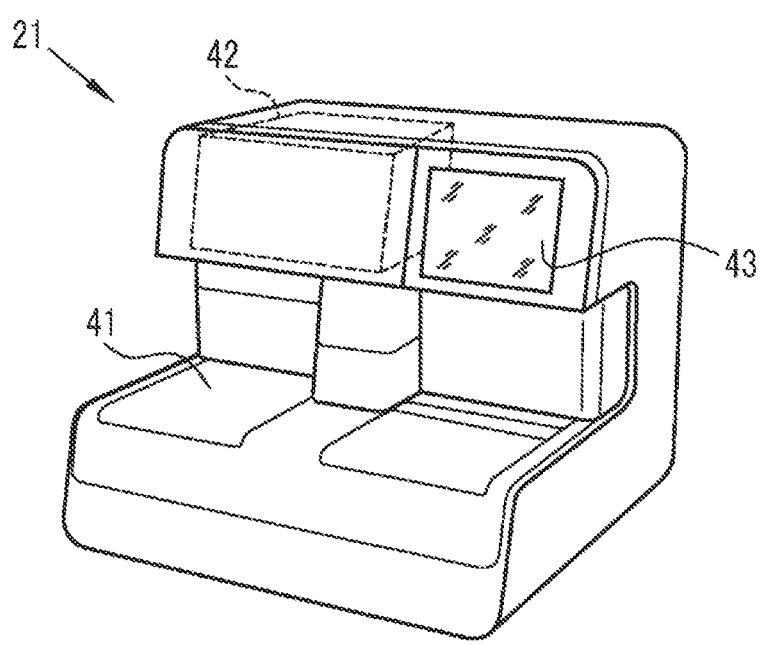
FIG. 3 is a perspective view showing an example of a fecal occult blood test device (test device).

FIG. 3 is a perspective view showing a fecal occult blood test device as an example of the test device 21. The test device 21 comprises a sample container placing portion 41, a test unit 42 which is a substantive mechanism for performing a test, and a touch panel 43 which functions as an operation unit and a display unit of the test device 21. The test device 21 includes, for example, a central processing unit (CPU), a read only memory (ROM), a random access memory (RAM), and the like.

Figure 9:
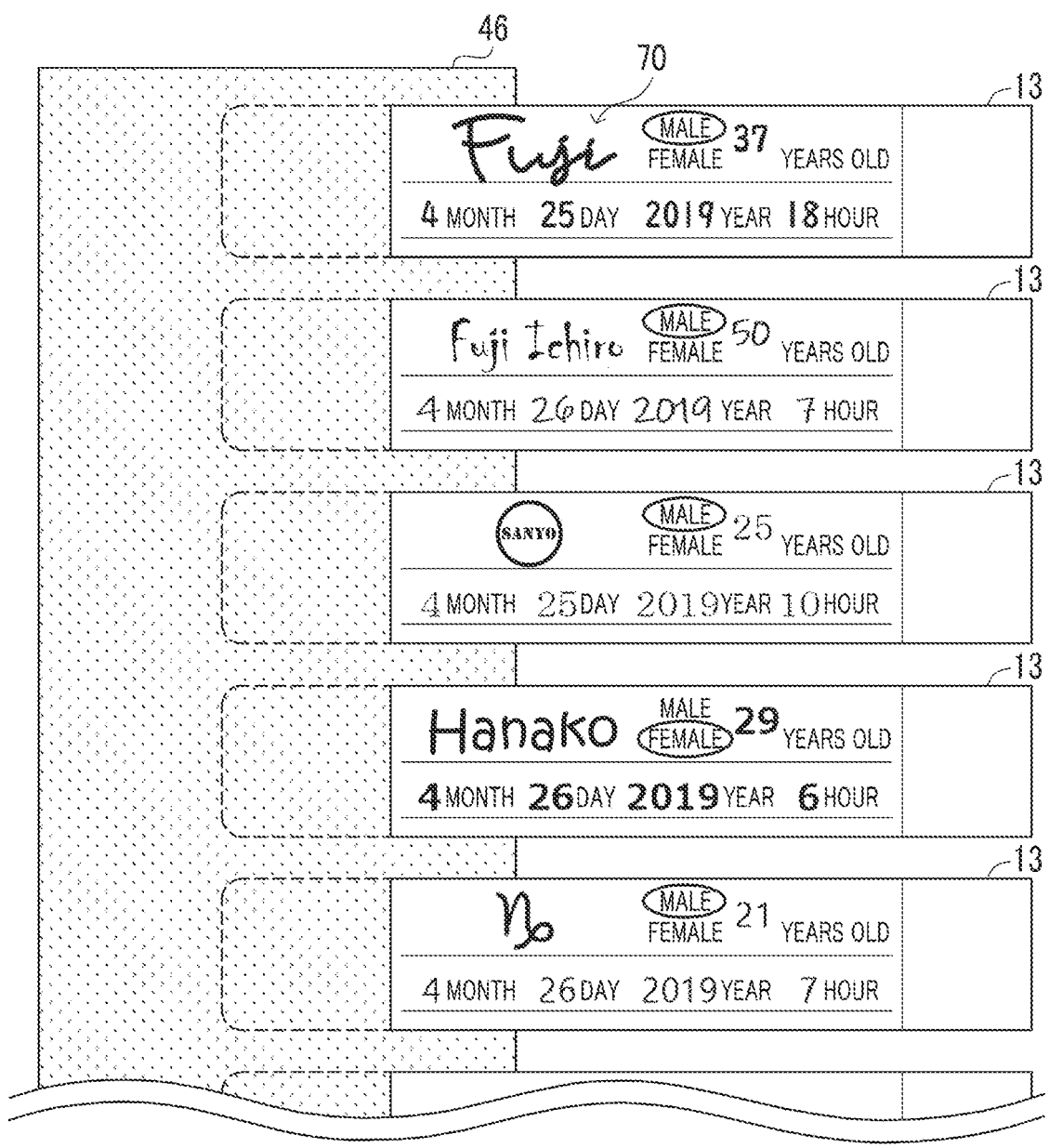
FIG. 9 is a diagram showing an example of a state in which a sample container is housed in a rack.

The sample container placing portion 41 is a portion on which one or plural sample containers 13 are placed in a case of performing a test. In the present embodiment, as shown in FIG. 9, plural sample containers 13 are set in a rack 46 that holds a portion related to the discrimination information 70 in a state of not being hidden in the rack 46, and the plurality of sample containers 13 are placed on the sample container placing portion 41 together with the rack 46. The plurality of sample containers 13 related to the same subject 10 may be set in one rack 46, but in the following description, it is assumed that the sample containers 13 set in the rack 46 are submitted by different subjects 10.

Figure 5:
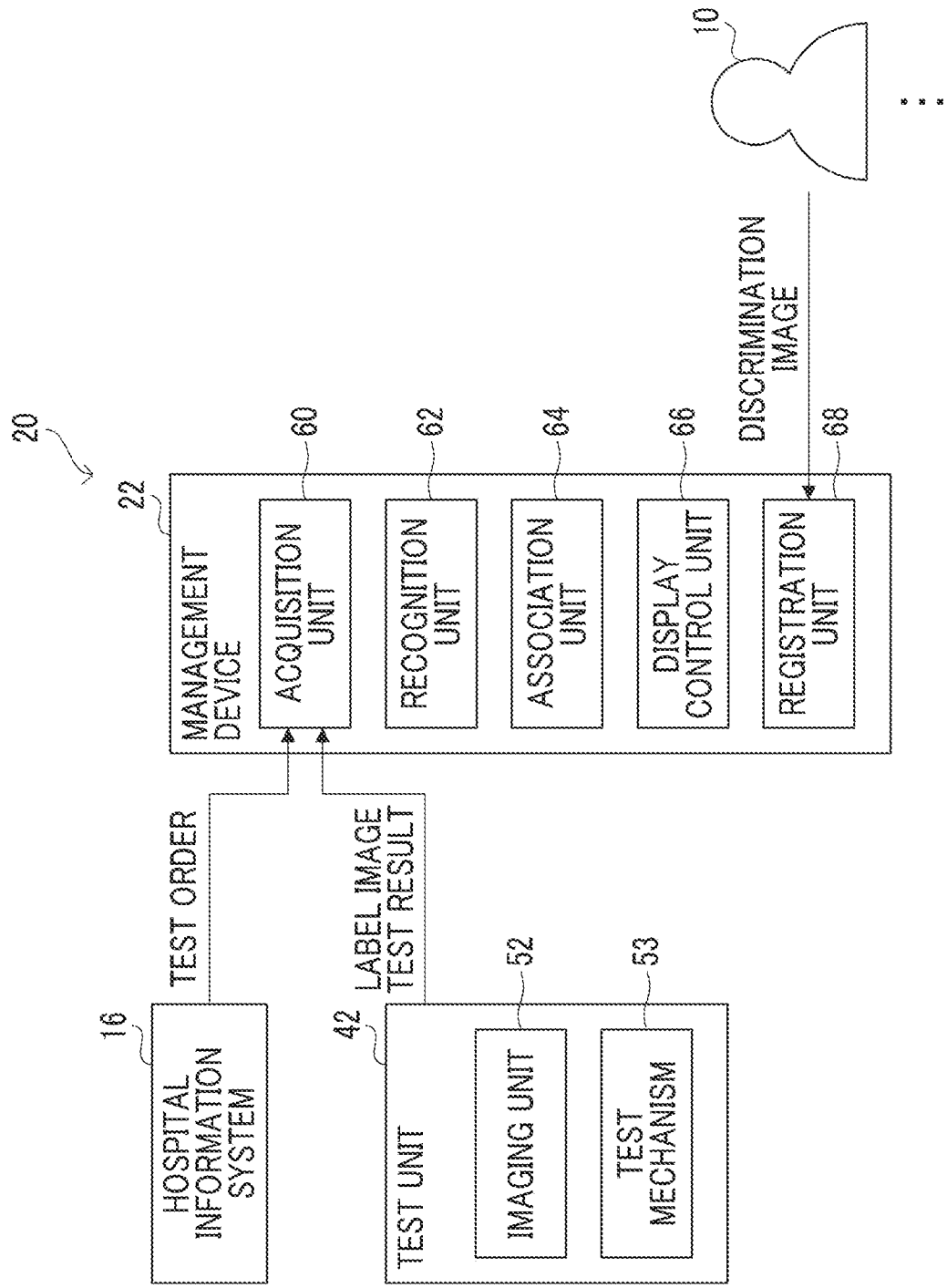
FIG. 5 is a block diagram showing an example of a functional configuration of the management device according to each embodiment.

As shown in FIG. 5, the test unit 42 comprises an imaging unit 52 and a test mechanism 53. The test mechanism 53 is a mechanism for sequentially performing a fecal occult blood test on the samples contained in the plurality of sample containers 13 set in the rack 46, and includes a stock of reagents used for the fecal occult blood test. In a case where the test is completed, the test mechanism 53 may control the touch panel 43 to sequentially display the test result, the progress of the test, and the like.

The imaging unit 52 includes an imaging device such as a camera. The imaging unit 52 images an area including the discrimination information 70 given to the outer surface of the sample container 13 to obtain a captured image at the timing of providing the sample contained in each sample container 13 to the test mechanism 53. The imaging unit 52 may image the plurality of sample containers 13 set in the rack 46 individually, or image some or all of the plurality of sample containers 13 set in the rack 46 together. In addition, the imaging unit 52 generates a label image 55 for each of the plurality of subjects 10 by extracting an area including the discrimination information 70 from the captured image.

The test device 21 outputs a test result obtained by the test mechanism 53 and the label image 55 of the sample container 13 in which the sample for which the test result is obtained is contained to the management device 22 in association with each other (see FIG. 10).

An ID (IDentifier) may be given to the rack 46 by using a barcode, an IC chip, or the like (not shown) so that the test device 21 can individually recognize the rack 46. According to such a form, the sample container 13 and the test result can be managed for each rack 46, so that confusion can be suppressed.

Figure 4:
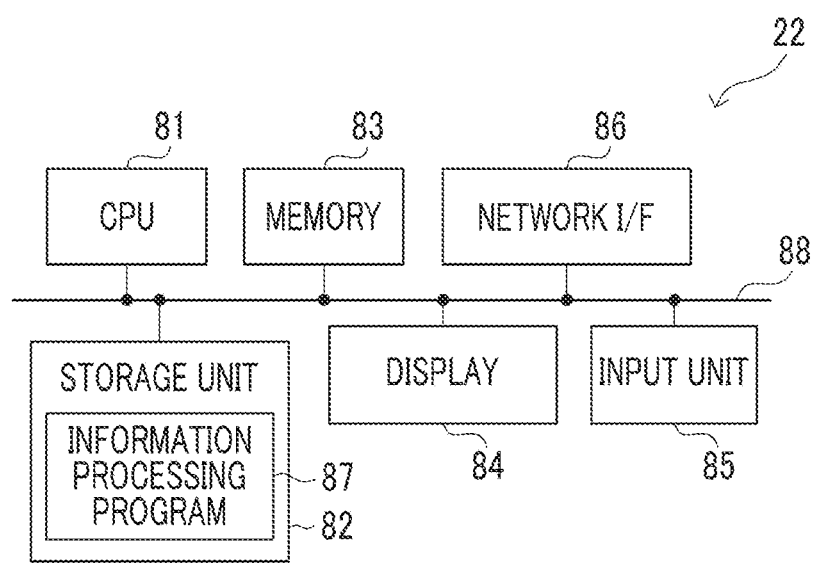
FIG. 4 is a block diagram showing an example of a hardware configuration of a management device according to each embodiment.

Next, a hardware configuration of the management device 22 according to the present embodiment will be described with reference to FIG. 4. As shown in FIG. 4, the management device 22 includes a CPU 81, a non-volatile storage unit 82, and a memory 83 as a temporary storage area. Further, the management device 22 includes a display 84 such as a liquid crystal display and an organic electro luminescence (EL) display, an input unit 85 such as a keyboard and a mouse, and a network interface (I/F) 86 connected to a network. The CPU 81, the storage unit 82, the memory 83, the display 84, the input unit 85, and the network I/F 86 are connected to a bus 88. The CPU 81 is an example of the processor in the present disclosure.

The storage unit 82 is realized by a storage device such as a hard disk drive (HDD), a solid state drive (SSD), and a flash memory. An information processing program 87 is stored in the storage unit 82 as the storage medium. The CPU 81 reads out the information processing program 87 from the storage unit 82, loads the read-out program into the memory 83, and executes the loaded information processing program 87.

Next, a functional configuration of the management device 22 according to the present embodiment will be described with reference to FIGS. 5 to 13. As shown in FIG. 5, the management device 22 includes an acquisition unit 60, a recognition unit 62, an association unit 64, a display control unit 66, and a registration unit 68. The CPU 81 executes the information processing program 87, and thus, the management device 22 functions as the acquisition unit 60, the recognition unit 62, the association unit 64, the display control unit 66, and the registration unit 68.

As shown in FIG. 5, the acquisition unit 60 acquires a test order from the hospital information system 16. FIG. 6 shows an example of a test order. As shown in FIG. 6, the test order includes information of a subject 10 who performs a test, that is, a subject 10 who collects a sample (hereinafter, referred to as "subject information"). The subject information includes, for example, information such as the name, gender, and age of the subject 10, and a subject ID assigned to each subject 10. In addition, the test order may include information indicating the target and contents of the test to be performed.

The test order is created for each group to which the subject belongs, such as a company and a school. FIG. 6 shows an example in which test orders are created for each of "Company P" and "Company Q" as an example of the group. The test order may include information on the group to which the subject belongs as the subject information.

Incidentally, in the test in the related art, the tester visually confirms the subject information such as the name given to the outer surface of the sample container 13 by the subject 10, and thereby the sample container 13 and the subject 10 included in the test order are associated with each other. Further, in recent years, by recognizing the subject information given to the outer surface of the sample container 13 by character recognition technology such as optical character recognition/reader (OCR), a technology for improving the efficiency of associating the sample container 13 with the test order is also being developed.

However, in a case where the subject information is given to the outer surface of the sample container 13 by the handwritten character of the subject 10, notational fluctuations (for example, kanji, hiragana, katakana, and the like), continuous writing (for example, semi-cursive script in kanji and cursive script in alphabet), and bad writing may be included. In such a case, the result of character recognition will be different from the subject information included in the test order, and it will be difficult to properly associate the sample container 13 with the test order.

Therefore, the management device 22 according to the present embodiment associates the sample container 13 based on the discrimination image 72 with the test order by registering in advance the information of the discrimination image 72 including the discrimination information 70 for discriminating the subject given to the outer surface of the sample container 13 in the test order. That is, the management device 22 according to the present embodiment treats the discrimination information 70 given to the outer surface of the sample container 13 as an image, and associates the sample container 13 with the test order based on the image.

Here, the "association" between the sample container 13 and the test order refers to specifying the specific sample container 13 as the sample container 13 related to the specific test order. In other words, the "association" is substantially synonymous with specifying the test result related to the sample of the specific sample container 13 as the test result related to the specific test order, and identifying that the specific subject 10 who provided the sample of a specific sample container 13 is the subject 10 related to the specific test order. This is because, in a case where one of these is associated, the other is automatically determined. Further, since the sample container 13 has a one-to-one correspondence with the label image 55, the association between the sample container 13 and the test order can be rephrased as the association between the label image 55 and the test order.

First, a registration process of registering the information of the discrimination image 72 in the test order in the management device 22 will be described. The registration process is performed between the time when the acquisition unit 60 acquires the test order and the time when the test result and the test order are associated with each other.

Figure 7:
FIG. 7 is a diagram showing an example of a pre-registration form for registering a discrimination image.

A form in which an image obtained in advance of the his/her own discrimination information 70 entered on a form by each subject 10 is used as the discrimination image 72 including the discrimination information 70 will be described as an example. FIG. 7 is a diagram showing a pre-registration form 74 as an example of a form for registering information of the discrimination image 72 including the discrimination information 70. As shown in FIG. 7, the pre-registration form 74 is provided with a field for entering the subject information ("name", "age", "gender", and "affiliation group") and a field for entering the discrimination information 70.

The subject 10 enters his/her own subject information and his/her own discrimination information 70 given to the outer surface of the sample container 13 on the pre-registration form 74, and then converts the pre-registration form 74 into image data and submits it to the testing institution 12. Specifically, for example, each subject 10 converts his/her own pre-registration form 74 into image data by capturing an image with an imaging device such as a digital camera or reading it with a reading device such as a scanner, and transmits the image data to the management device 22 via the network. The subject 10 is only required to submit the image data of the pre-registration form 74 before the management device 22 associates the test result with the test order.

The acquisition unit 60 of the management device 22 acquires the image data of the pre-registration form 74 received from each subject 10. The recognition unit 62 recognizes the subject information based on the image data of the pre-registration form 74. Specifically, the recognition unit 62 recognizes the subject information such as the name, age, gender, and affiliation group of the subject from the image data of the pre-registration form 74 by using a character recognition function such as optical character recognition/reader (OCR).

The registration unit 68 associates the image data of the pre-registration form 74 with the test order based on the subject information recognized by the recognition unit 62, and registers the information of the discrimination image 72 including the discrimination information 70 entered on the pre-registration form 74 in the test order. Since the test order includes the subject information corresponding to the subject information entered on the pre-registration form, the image data of the pre-registration form 74 can be associated with the test order. FIG. 8 shows a state in which the discrimination image 72 corresponding to each subject 10 is registered in the test order shown in FIG. 6. That is, at this time point, the test order is in a state in which the subject information and the information of the discrimination image 72 are associated with each subject. The registration unit 68 may register the discrimination image 72 as image data in the test order, or may register information on the feature amount of the image extracted from the discrimination image 72 by a known method in the test order.

As the discrimination information 70, any information capable of discriminating (that is, specifying) the subject 10 can be used. For example, the discrimination information 70 may include at least one of a signature, a symbol, a picture, or a photograph set by each subject 10. Specifically, it may be a signature, an imprint, a mathematical symbol, a mark such as a star, a pictogram, a face photograph, or the like using all or part of the name of the subject 10.

Further, for example, the discrimination information 70 may include a first identification number set for each subject 10. Specifically, the discrimination information 70 may be the employee number of the subject 10. Further, for example, the discrimination information 70 may include a second identification number set for each sample container 13. Specifically, the discrimination information 70 may be given a different serial number to the sample container 13 in advance for each sample container 13. In these cases, the time and effort for the subject 10 to set the discrimination information 70 can be omitted.

In a case where the above registration process is completed, as shown in FIG. 9, the tester sets the plurality of sample containers 13 to be tested in the rack 46 and causes the test device 21 to test the samples. The order in which the sample containers 13 are arranged on the rack 46 is random, and may be different from the order registered in the test order.

The acquisition unit 60 acquires the test result and the label image 55 including the discrimination information 70 from the test device 21. As described above, the test result and the label image 55 are output from the test device 21 in association with each other as shown in FIG. 10. In the example of FIG. 10, a "measured value" is shown as an example of the test result. In addition, the example of FIG. 10 also includes a "test ID" corresponding to the label image 55 and the test result. The "test ID" represents the order in which the tests were performed (or the order in which the test results were acquired), and is attached to, for example, a set of the label image 55 and the test result in a case where the acquisition unit 60 acquires the label image 55 and the test result corresponding to each other.

Figure 11:
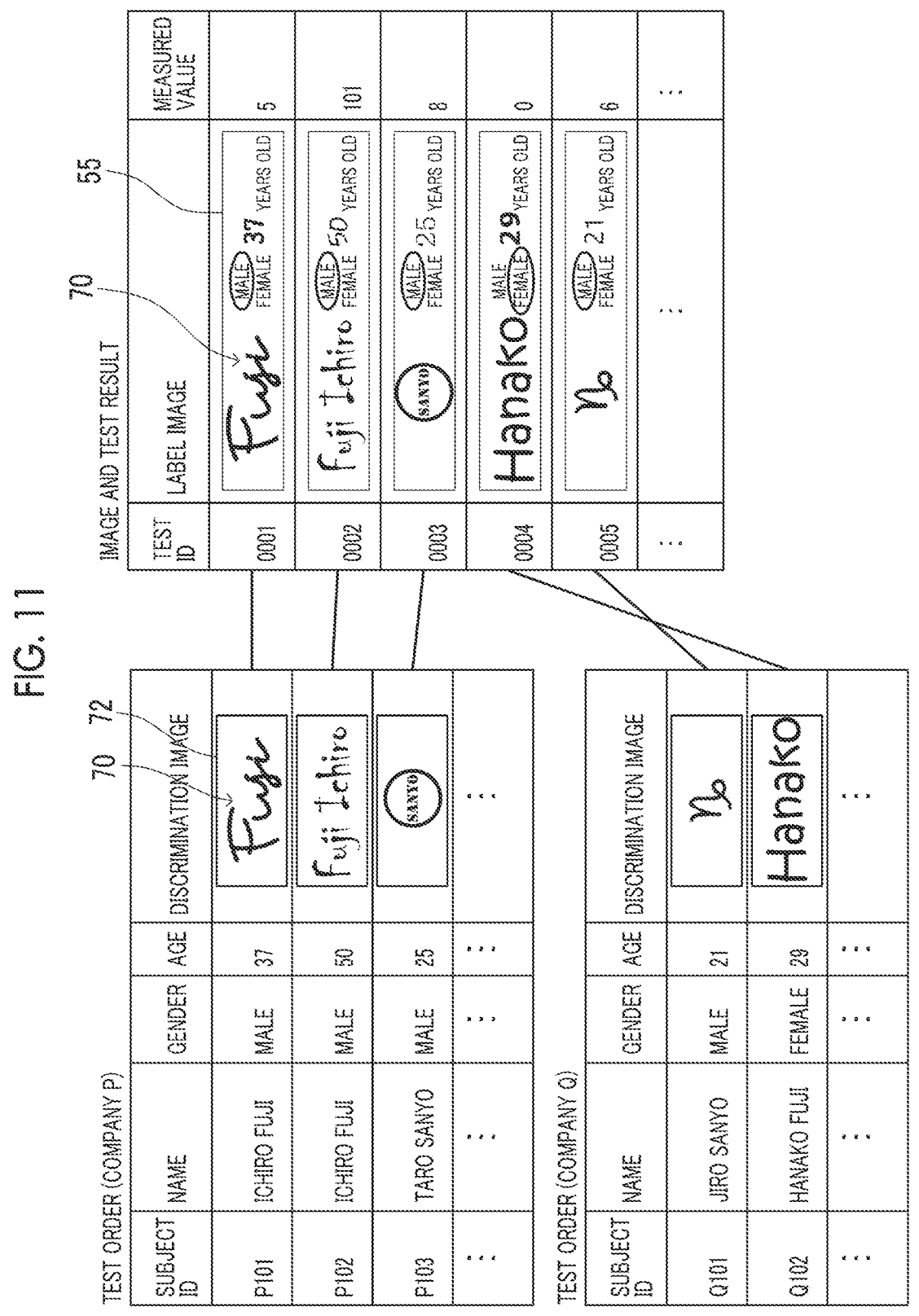

The association unit 64 associates the test result related to the sample contained in each sample container 13 with a test order in which information of the discrimination image 72 including the discrimination information 70 is registered in advance for each subject 10, based on the label image 55 including the discrimination information 70 (see FIG. 10) and the test order (see FIG. 8). Specifically, as shown in FIG. 11, the association unit 64 associates the test result with the test order in which the respective images substantially match by comparing the image of the discrimination information 70 included in the label image 55 with the information of the discrimination image 72 registered in the test order.

As described above, the discrimination image 72 in the present embodiment is an image obtained by imaging or reading the discrimination information 70 entered on the pre-registration form 74 by the subject 10. That is, the subject 10 enters the discrimination information 70 on each of the sample container 13 and the pre-registration form 74. Therefore, in a case where the discrimination information 70 is a signature handwritten by the subject, for example, the handwriting of the signature (discrimination information 70) included in the label image 55 extracted from the captured image of the sample container 13 and the signature (discrimination information 70) included in the discrimination image 72 acquired by imaging or reading the pre-registration form 74 may not completely match. Further, for example, the discrimination image 72 captured or read by the subject 10 may be unclear.

Therefore, the association unit 64 may calculate the degree of similarity between the image of the discrimination information 70 included in the label images 55 related to the plurality of sample containers 13 and the discrimination image 72 related to the plurality of subjects 10, and associate the test result of the combination having the highest degree of similarity of each image with the test order. In this case, even in a case where the label image 55 and the discrimination image 72 do not completely match as described above, it is possible to perform an association that is tentatively considered to have the highest degree of matching. As a method for calculating the degree of similarity between the label image 55 and the discrimination image 72, a known method can be appropriately applied.

As shown in FIG. 12, the display control unit 66 performs control such that the label image 55, the test result, and the test order are displayed on the display 84 in association with each other. The display of the label image 55 may be omitted, or the discrimination image 72 may be displayed. Further, the management device 22 may transmit a test result report as shown in FIG. 12 to the hospital information system 16 or the like of the hospital 11.

Figure 13:
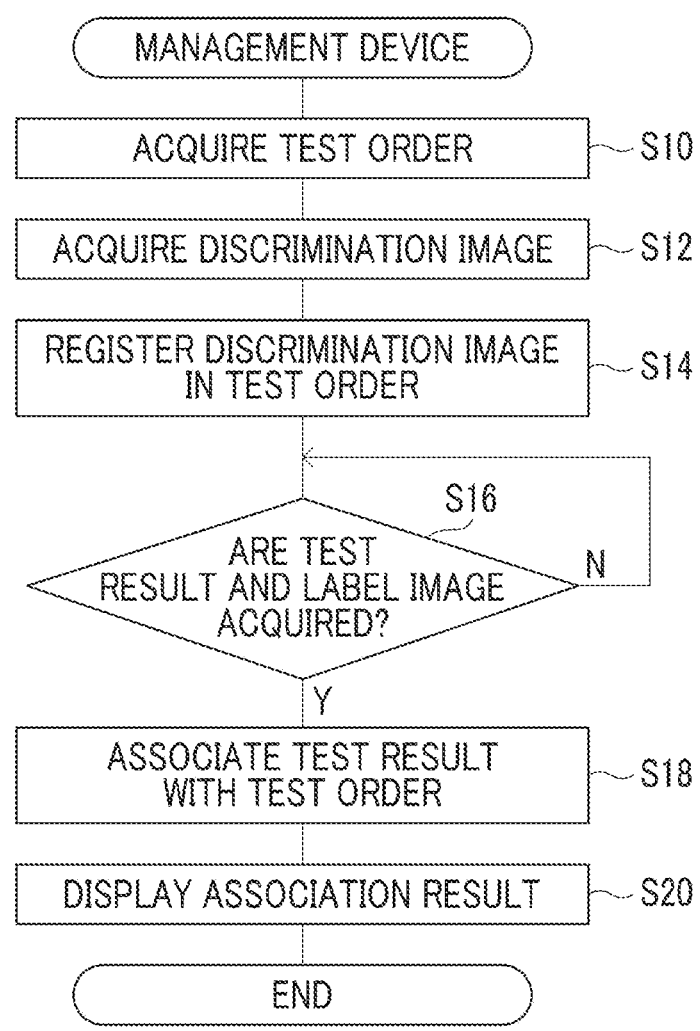
FIG. 13 is a flowchart showing an example of a process in the management device.

Next, an operation of the management device 22 according to the present embodiment will be described with reference to FIG. 13. The CPU 81 executes the information processing program 87, and thus, the process shown in FIG. 13 is executed. The process shown in FIG. 13 is executed in a case where, for example, an operator such as a tester inputs an instruction to start a test via the input unit 85.

In Step S10 of FIG. 13, the acquisition unit 60 acquires a test order from the hospital information system 16. In Step S12, the acquisition unit 60 acquires the discrimination image 72 from each subject 10. Specifically, the image data of the pre-registration form 74 including the subject information and the discrimination information 70 (that is, the image data including the discrimination image 72 including the discrimination information 70) is acquired from each subject 10. The process of Step S10 and the process of Step S12 may be performed in parallel or may be performed in a different order.

In Step S14, the registration unit 68 registers the information of the discrimination image 72 acquired in Step S12 in the test order acquired in Step S10. Specifically, the recognition unit 62 recognizes the subject information based on the image data of the pre-registration form 74 acquired in Step S12. Further, the registration unit 68 associates the image data of the pre-registration form 74 (that is, the image data including the discrimination image 72 including the discrimination information 70) with the test order based on the recognized subject information, and registers the information of the discrimination image 72 in the test order. In Step S16, the acquisition unit 60 waits until the test result and the label image 55 are acquired from the test device 21.

Here, the process performed by the test device 21 between the above-mentioned Steps S14 and S16 will be described with reference to FIG. 14. The process shown in FIG. 14 is executed in a case where, for example, an operator such as a tester inputs an instruction to start a test via the touch panel 43.

Figure 14:
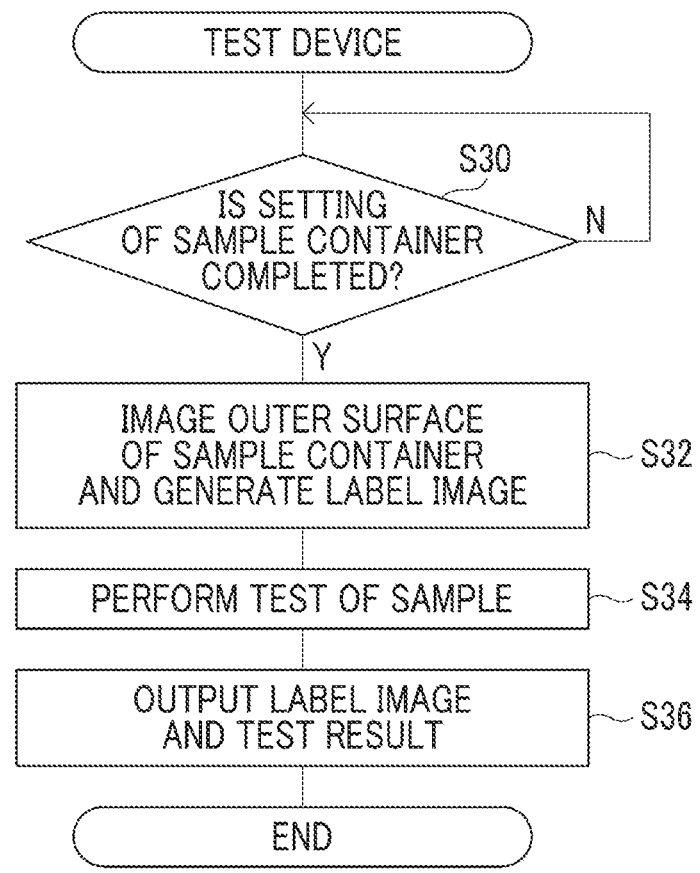
FIG. 14 is a flowchart showing an example of a process in the test device.

In Step S30 of FIG. 14, the test device 21 determines whether or not the sample container 13 is set in the sample container placing portion 41. In a case where the sample container 13 is set in the sample container placing portion 41 (Step S30 is Y), in Step S32, the imaging unit 52 images an area including at least the discrimination information 70 given to the outer surface of the sample container 13 to obtain a captured image. In addition, the imaging unit 52 generates a label image 55 for each of the plurality of subjects 10 by extracting an area including the discrimination information 70 from the captured image. In Step S34, the test mechanism 53 performs the test of the sample. In Step S36, the test device 21 outputs the label image 55 obtained in Step S32 and the test result obtained in Step S34 in association with each other to the management device 22. The process of Step S32 and the process of Step S34 may be performed in parallel or may be performed in a different order.

Referring back to FIG. 13, a description will be given. In Step S18 of FIG. 13, the association unit 64 associates the test result related to the sample contained in each sample container 13 acquired in Step S16 with the test order in which the information of the discrimination image 72 is registered in Step S14, based on the label image 55 acquired in Step S16 and the test order. In Step S20, the display control unit 66 performs control such that the test result and the test order associated in Step S20 are displayed on the display 84 in association with each other.

As described above, the management system 20 according to the present embodiment is a management system including at least one processor. The processor is configured to acquire a captured image obtained by imaging an outer surface of each of plural sample containers which contains a sample and in which discrimination information for discriminating a subject from whom the sample is collected is given to the outer surface. In addition, the processor is configured to associate a test result related to the sample contained in each of the sample containers with a test order in which information of a discrimination image including the discrimination information is registered in advance for each subject, based on the captured image and the test order. According to such a form, since the discrimination information 70 given to the outer surface of the sample container 13 can be treated as an image, and the sample container 13 and the test order can be associated with each other based on the image, it is possible to appropriately associate the test result with the test order.

In the above embodiment, an example of a form in which the subject 10 enters the subject information on the pre-registration form 74 and the recognition unit 62 recognizes the subject information has been described, but the present disclosure is not limited thereto. For example, the subject 10 may transmit text data including the subject information to the management device 22 together with the image data of the discrimination image 72 including the discrimination information 70. In this case, the character recognition process by the recognition unit 62 can be omitted, and the registration unit 68 can register the information of the discrimination image 72 in the test order based on the received text data.

Further, in the above embodiment, an example of a form in which the subject 10 separately enters the his/her own discrimination information 70 given to the outer surface of the sample container 13 on the pre-registration form 74 has been described, but the present disclosure is not limited thereto. For example, the subject 10 may transmit the image data obtained by imaging the discrimination information 70 given to the outer surface of the sample container 13 as the discrimination image 72 to the management device 22. That is, the subject 10 may transmit the image data obtained by imaging the sample container 13 to the management device 22. In this case, by re-entering the discrimination information 70 given to the outer surface of the sample container 13 on the pre-registration form 74, there is no discrepancy in the discrimination information 70. Therefore, in a case where the association unit 64 compares the label image 55 with the discrimination image 72, it is advantageous to match the respective images, and the test result and the test order can be more appropriately associated with each other.

Further, in the above embodiment, an example of a form in which the subject 10 converts the pre-registration form 74 into image data has been described, but the present disclosure is not limited thereto. For example, the subject 10 may transmit the image data generated by each subject 10 drawing his/her own discrimination information 70 on a drawing device as the discrimination image 72 to the management device 22. The drawing device is, for example, a terminal provided with a touch panel such as a smartphone or a tablet. In the case where the subject information is transmitted to the management device 22 as text data as described above, the time and effort of imaging or reading (that is, converting into image data) by the subject 10 can be omitted.

Further, in the above embodiment, an example of a form in which the subject 10 himself/herself converts the pre-registration form 74 into image data has been described, but the present disclosure is not limited thereto. For example, each subject 10 may mail the pre-registration form 74 to the testing institution 12, and the testing institution 12 may collectively perform image data conversion by imaging or reading the pre-registration form 74. In this case, the quality such as the imaging range or reading range, size, and resolution of the image data obtained by imaging or reading the pre-registration form 74 can be centrally managed. Therefore, in a case where the association unit 64 compares the label image 55 with the discrimination image 72, it is advantageous to match the respective images, and the test result and the test order can be more appropriately associated with each other.

Further, in a case where it is difficult to associate the label image 55 with the discrimination image 72 only by comparing them, the association unit 64 may associate the test result with the test order based on the subject information included in the label image 55 and the subject information included in the test order. Further, in this case, the recognition unit 62 may recognize the subject information given to each sample container 13 based on the label image 55, and the association unit 64 may associate the test result with the test order based on the subject information recognized by the recognition unit 62. The case where it is difficult to associate the label image 55 with the discrimination image 72 only by comparing them includes, for example, a case where different subjects 10 use the same or similar discrimination information 70. In such a case, by associating the test result with the test order based on the subject information, the reliability of the association between the test result and the test order can be improved.

Further, the management device 22 may store the information of the discrimination image 72 received from each subject 10 in the storage unit 82 in association with the subject information, and use the information of the discrimination image 72 stored in the storage unit 82 in a case where the subject 10 undergoes a retest or the like. In such a case, in a case where the subject 10 gives the discrimination information 70 included in the information of the discrimination image 72 stored in the storage unit 82 to the outer surface of the sample container 13 to be retested, it is possible to appropriately associate the test result with the test order without performing the registration process of the discrimination image 72 again.

Further, in the registration process, the management device 22 may determine whether or not the discrimination image 72 received from each subject 10 is the same as or similar to the discrimination image 72 of another subject 10 already stored in the storage unit 82. Further, in a case where it is determined that they are the same or similar, the management device 22 may refuse to register the discrimination image 72 and notify the subject 10 to change the discrimination image 72 (that is, change the discrimination information 70). As a method for determining whether or not the discrimination images 72 are the same or similar, a known method can be appropriately applied.

Further, in a case where a predetermined storage period elapses after the information of the discrimination image 72 and the subject information are stored in the storage unit 82, the management device 22 may delete the information of the discrimination image 72 and the subject information. For example, as shown in FIG. 7, a registration date field may be provided on the pre-registration form 74, and the storage period of the information of the discrimination image 72 and the subject information may be managed according to the date entered in the field.

Further, the management device 22 may accept editing of the information of the discrimination image 72 stored in the storage unit 82 by the subject 10. For example, as shown in FIG. 7, in a case where an editing password field for editing the information of the discrimination image 72 is provided on the pre-registration form 74, and the subject information and the editing password match, editing of the information of the discrimination image 72 may be permitted.

Second Embodiment

In the present embodiment, in order to more appropriately associate the test result with the test order, an example of a form in which information regarding the group to which the subject 10 belongs is further used in addition to the discrimination image 72 will be described. Hereinafter, the same components as those in the first embodiment will be designated by the same symbols, and the description thereof will be omitted.

Usually, the test in the test device 21 is performed in the order of test order by the tester setting the sample container 13 in the rack 46 for each test order (that is, for each group). On the other hand, in order to improve the efficiency of the test work, especially in a case where the rack 46 has an empty space, it is desired that the sample containers 13 included in plural different groups are set in the same rack 46 and continuously tested. In such a case, in a case where the boundary between the groups can be determined, it is possible to specify a group to which each sample container 13 belongs.

Therefore, in the present embodiment, in a case where there are plural groups of subjects and samples are continuously tested for the plurality of groups, the boundary between the groups is determined by using a boundary container in which the group boundary information 102 indicating the boundary between the plurality of groups is given on the outer surface. The group boundary information 102 may include group discrimination information 104 for discriminating the group to which the subject 10 belongs. The group boundary information 102 and the group discrimination information 104 are represented by at least one of a character or a symbol.

The boundary container is, for example, a sample container 13 containing a sample to be tested at at least one of first or last in the group. Hereinafter, an example in which the group boundary information 102 is given to the outer surface of the sample container 13 containing the sample to be tested first in each group as an example of the boundary container will be described.

Figure 15:
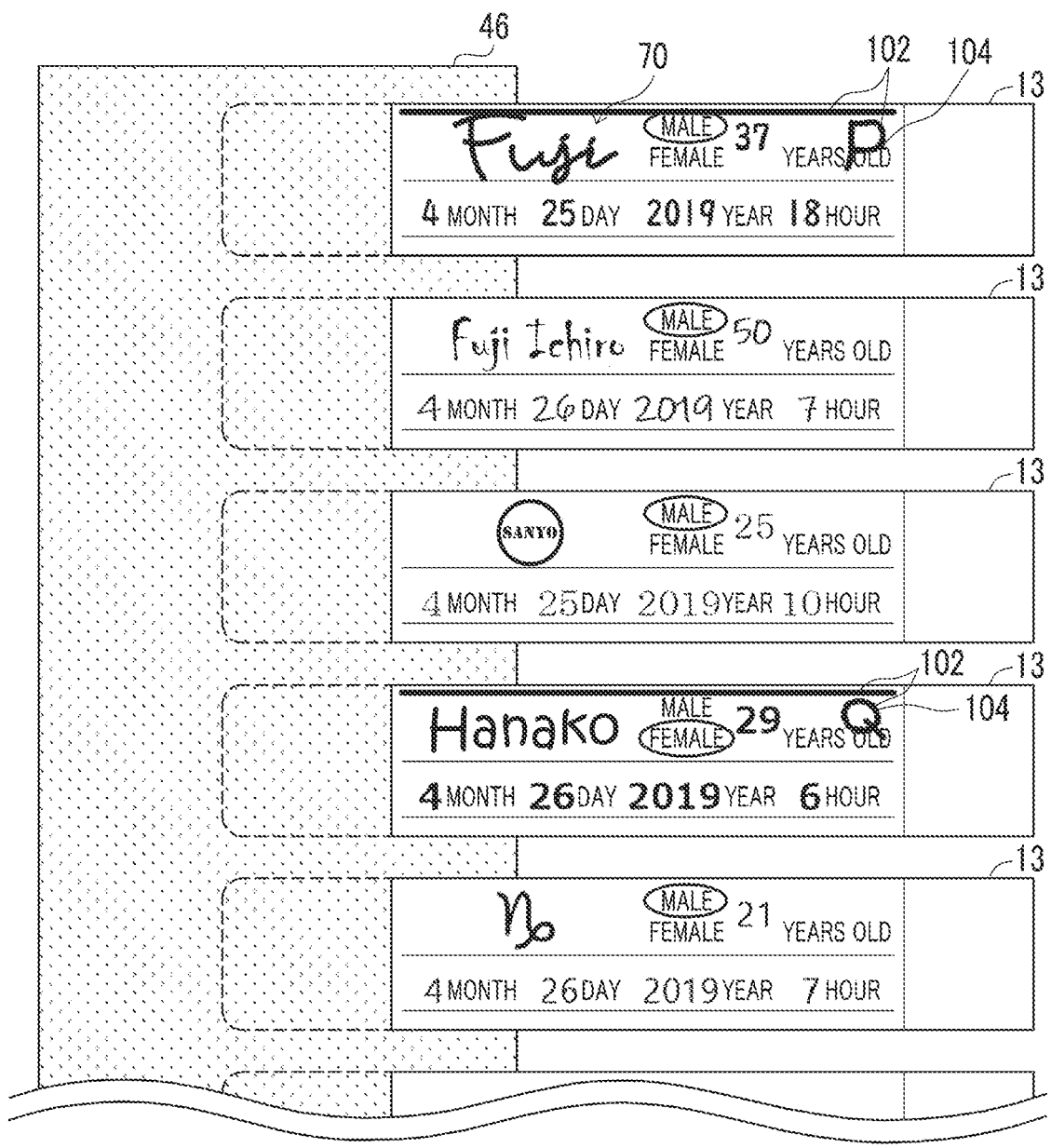
FIG. 15 is a diagram showing an example of a sample container to which group boundary information is given.

FIG. 15 shows an example in which one line as an example of the group boundary information 102 and the characters "P" and "Q" are given to the first sample container 13 of each group of company P and company Q, respectively. Of these, the characters "P" and "Q" also function as the group discrimination information 104 for discriminating the groups of company P and company Q, respectively.

As shown in FIG. 15, the tester gives the group boundary information 102 to the first sample container 13 of the group, sets the information in the rack 46, and executes the test by the test device 21. The sample container 13 is set in the rack 46 in the order of test order so that company P comes first and company Q comes later, for example, as a bundle for each group. That is, the test is performed for each group in the order of test order. The order in which the sample containers 13 are arranged in each group is random, and may be different from the order registered in the test order.

The acquisition unit 60 acquires the test result and the label image 55 from the test device 21. The label image 55 includes discrimination information 70, subject information, and group boundary information 102. Further, the group boundary information 102 may include the group discrimination information 104.

The recognition unit 62 recognizes the subject information given to each sample container 13 and the group boundary information 102 given to the boundary container based on the label image 55. Further, in a case where the group boundary information 102 includes the group discrimination information 104, the recognition unit 62 recognizes the group discrimination information 104. The recognition unit 62 may recognize the subject information as described above.

Figure 16:
FIG. 16 is a diagram showing a process of associating a test result with a test order.

The association unit 64 determines that the sample container 13 recognized that the group boundary information 102 is given to the label image 55 is the first sample container 13 of each group of company P and company Q. As shown in FIG. 16, the association unit 64 associates a test result related to the sample contained in each of the sample containers 13 with the test order in which the group is divided corresponding to the group boundary information 102, based on the recognition result of the recognition unit 62 and the test order.

Here, the "test order in which the group is divided corresponding to the group boundary information 102" means, for example, the test order created for each group as described above. Further, for example, it means a test order in which information on the group to which the subject 10 belongs is included for each of the plurality of subjects 10. Further, for example, in a case where one test order includes plural groups, it means the test order including the information indicating the boundary of the group represented by a predetermined character string and blanks at the boundary between the groups.

As described above, the test is performed for each group in order of test order. Therefore, even in a case where the group boundary information 102 does not include the group discrimination information 104, the group boundary information 102 shows the boundary between the groups, so that a group to which each sample container 13 belongs can be specified.

Further, in a case where the group boundary information 102 includes the group discrimination information 104, the association unit 64 associates a test result related to the sample contained in each of the sample containers 13 with the test order further including the group discrimination information 104, based on the recognition result of the recognition unit 62 and the test order. In this case, by collating the group discrimination information 104 recognized from the label image 55 with the group discrimination information 104 (for example, "Company P" and "Company Q") included in the test order, each of the plurality of subjects 10 having the same surname and the same name existing in different groups can be associated with each other.

As described above, in the management system 20 according to the present embodiment, in a case where there are plural groups of the subjects 10 and the samples are continuously tested for the plurality of groups, group boundary information 102 indicating a boundary between the plurality of groups is further given to the outer surface of the sample container 13 containing a sample to be tested at at least one of first or last in the group. Further, the processor is configured to recognize the group boundary information 102 based on the captured image, and associates a test result related to the sample contained in each of the sample containers 13 with the test order in which the group is divided corresponding to the group boundary information 102, based on a result of the recognition and the test order.

With the management system 20 according to the present embodiment, it is possible to determine the boundary between groups without giving an identification unit such as a barcode to the sample container 13 as in the related art. Therefore, it is possible to more appropriately associate the test result with the test order. Further, even though plural sample containers 13 included in each of plural different test orders are collectively set in the test device, the test result and the test order can be appropriately associated with each other.

Figure 17:
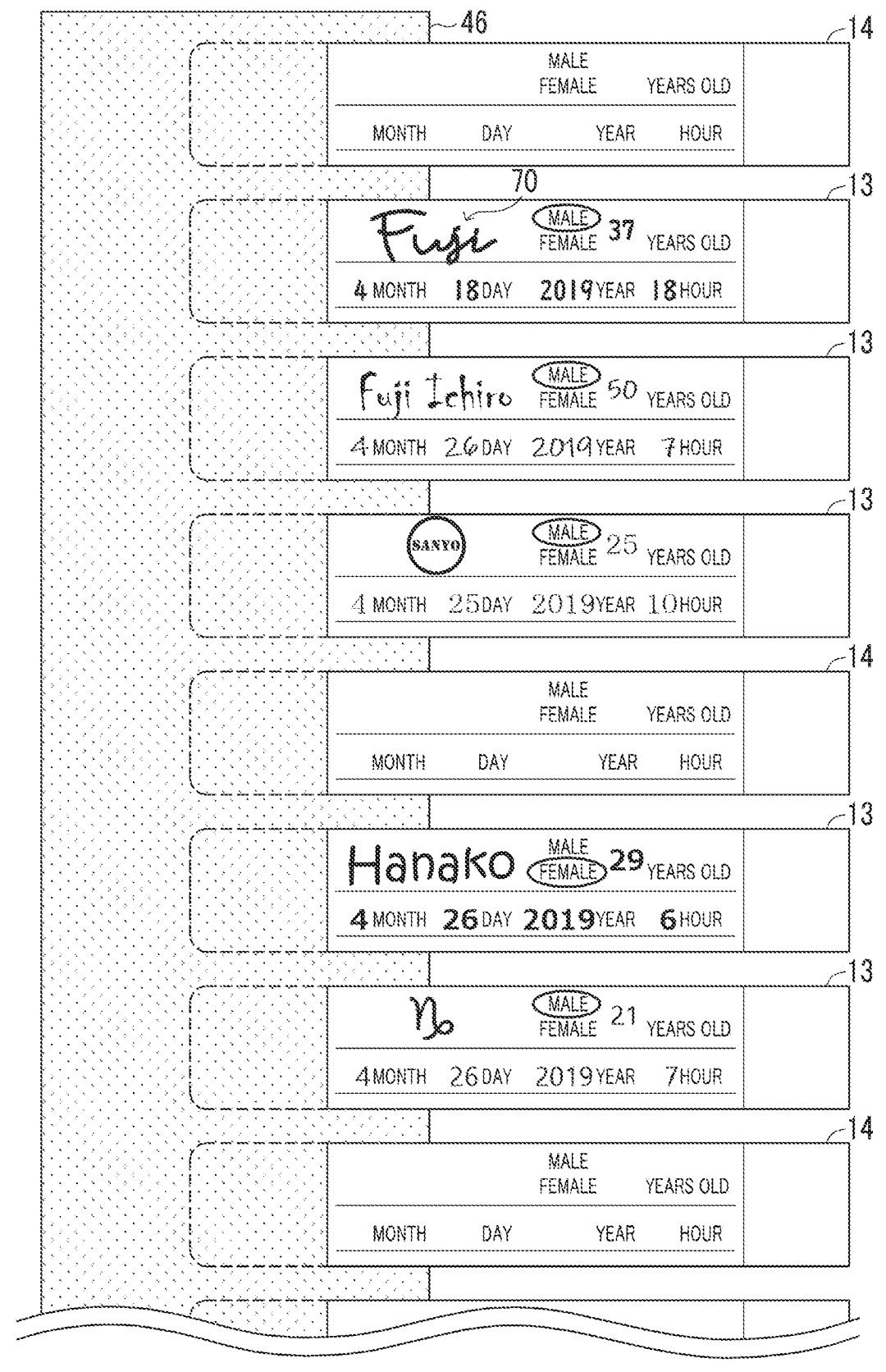

As the boundary container, for example, a dummy container 14 that does not contain a sample can be used in addition to the sample container 13 to which the group boundary information 102 is given as described above. FIG. 17 is a diagram showing an example in which a dummy container 14 in which no subject information is entered is used as an example. The dummy container 14 may have a shape that can be stored in the test device 21 for testing the sample contained in the sample container 13, and preferably has the same shape as the sample container 13.

In this case, the fact that the subject information is not entered on the outer surface of the dummy container 14 may be used as the group boundary information 102. As shown in FIG. 18, the association unit 64 determines the boundary of the group by the sample container 13 recognized that the subject information such as the name information is not given to the label image 55.

As shown in FIGS. 19 to 21, the group boundary information 102 and the group discrimination information 104 represented by at least one of a character or a symbol may be given to the outer surface of the dummy container 14. FIG. 19 shows an example of the dummy container 14 to which one line is given as an example of the group boundary information 102. FIG. 20 shows the dummy container 14 to which one line as an example of the group boundary information 102 and the characters "S" meaning the beginning of the group and "E" meaning the end of the group are given. FIG. 21 shows the dummy container 14 to which one line as an example of the group boundary information 102, and the characters "P" and "Q" are given. Of these, the characters "P" and "Q" also function as the group discrimination information 104 for discriminating the groups of company P and company Q, respectively.

As described above, according to the form in which the dummy container 14 is used, by giving the group boundary information 102 to the sample container 13, it is possible to suppress the difficulty in recognizing the discrimination information 70. Therefore, it is possible to more appropriately associate the test result with the test order. Further, by preparing the dummy container 14 in advance, the work of giving the group boundary information 102 to the sample container 13 by the tester can be omitted, so that the efficiency of the test work can be improved.

In each of the above embodiments, each functional unit included in the test device 21 and the management device 22 may be performed by an external device connected to the test device 21 and the management device 22. For example, the test device 21 may not include the imaging unit 52, the test device 21 may receive the label image 55 captured by an external imaging device such as a digital camera, and the received label image 55 may be output in association with the test result. Further, for example, the management device 22 may not include the recognition unit 62, and the management device 22 may receive the subject information, the group boundary information 102, and the group discrimination information 104 obtained by causing an external device having a character recognition function to recognize the label image 55.

In each of the above embodiments, for example, as hardware structures of processing units that execute various kinds of processing, such as the acquisition unit 60, the recognition unit 62, the association unit 64, the display control unit 66, and the registration unit 68, various processors shown below can be used. As described above, the various processors include a programmable logic device (PLD) as a processor of which the circuit configuration can be changed after manufacture, such as a field programmable gate array (FPGA), a dedicated electrical circuit as a processor having a dedicated circuit configuration for executing specific processing such as an application specific integrated circuit (ASIC), and the like, in addition to the CPU as a general-purpose processor that functions as various processing units by executing software (program).

One processing unit may be configured by one of the various processors, or configured by a combination of the same or different kinds of two or more processors (for example, a combination of plural FPGAs or a combination of the CPU and the FPGA). In addition, plural processing units may be configured by one processor. As an example where plural processing units are configured by one processor, first, there is a form in which one processor is configured by a combination of one or more CPUs and software as typified by a computer, such as a client or a server, and this processor functions as plural processing units. Second, there is a form in which a processor for realizing the function of the entire system including plural processing units by one integrated circuit (IC) chip as typified by a system on chip (SoC) or the like is used. As described above, various processing units are configured by using one or more of the above-described various processors as hardware structures.

Furthermore, as the hardware structure of the various processors, more specifically, an electrical circuit (circuitry) in which circuit elements such as semiconductor elements are combined can be used.

What is claimed is:

1. A management system comprising at least one processor, wherein the processor is configured to
    acquire a captured image obtained by imaging an outer surface of each of a plurality of sample containers which contains a sample and in which discrimination information for discriminating a subject from whom the sample is collected is given to the outer surface, and
    associate a test result related to the sample contained in each of the sample containers with a test order in which information of a discrimination image including the discrimination information is registered in advance for each subject, based on the captured image and the test order.

2. The management system according to claim 1, wherein the processor is configured to
associate the test result related to the sample contained in each of the sample containers with the test order by comparing an image of the discrimination information included in the captured image with the information of the discrimination image registered in the test order.

3. The management system according to claim 1, wherein the discrimination image is an image obtained by each subject imaging his/her own discrimination information in advance.

4. The management system according to claim 1, wherein the discrimination image is an image obtained by imaging the discrimination information entered on a form.

5. The management system according to claim 3, wherein the discrimination image is an image obtained by imaging the discrimination information given to the outer surface of the sample container.

6. The management system according to claim 1, wherein the discrimination image is an image generated by each subject drawing his/her own discrimination information on a drawing device.

7. The management system according to claim 1, wherein the discrimination information includes at least one of a signature, a symbol, a picture, or a photograph set by each subject.

8. The management system according to claim 1, wherein the discrimination information includes a first identification number set for each subject.

9. The management system according to claim 1, wherein the discrimination information includes a second identification number set for each sample container.

10. The management system according to claim 1, wherein the processor is configured to
acquire a captured image obtained by imaging an outer surface of a boundary container in which group boundary information indicating a boundary between a plurality of groups of subjects is given to the outer surface in a case where there are the plurality of groups and samples are continuously tested for the plurality of groups,
recognize the group boundary information given to the boundary container based on the captured image, and
associate the test result related to the sample contained in each of the sample containers with a test order in which the group is divided corresponding to the group boundary information, based on a result of the recognition and the test order.

11. The management system according to claim 10, wherein the boundary container is a sample container containing a sample to be tested at at least one of first or last in the group.

12. The management system according to claim 10, wherein the boundary container is a dummy container which does not contain a sample.

13. The management system according to claim 10, wherein the group boundary information includes group discrimination information for discriminating a group to which the subject belongs, and
the processor is configured to
further recognize the group discrimination information based on the captured image, and
associate the test result related to the sample contained in each of the sample containers with the test order further including the group discrimination information, based on a result of the recognition and the test order.

14. The management system according to claim 10, wherein the group boundary information is represented by at least one of a character or a symbol.

15. The management system according to claim 12, wherein a fact that subject information is not entered on an outer surface of the dummy container is used as the group boundary information.

16. The management system according to claim 1, wherein the processor is configured to
perform control such that the test result and the test order are displayed on a display in association with each other.

17. The management system according to claim 1, wherein the processor is configured to
generate a label image for each of a plurality of subjects by extracting an area including the discrimination information from the captured image, and
perform control such that the label image, the test result, and the test order are displayed on a display in association with each other based on the discrimination information included in the label image.

18. A management method comprising:
acquiring a captured image obtained by imaging an outer surface of each of a plurality of sample containers which contains a sample and in which discrimination information for discriminating a subject from whom the sample is collected is given to the outer surface; and
associating a test result related to the sample contained in each of the sample containers with a test order in which information of a discrimination image including the discrimination information is registered in advance for each subject, based on the captured image and the test order.

* * * * *